Aug. 26, 1924.
C. PETERSON
CLOTHESLINE REEL
Filed April 24, 1922
1,505,969
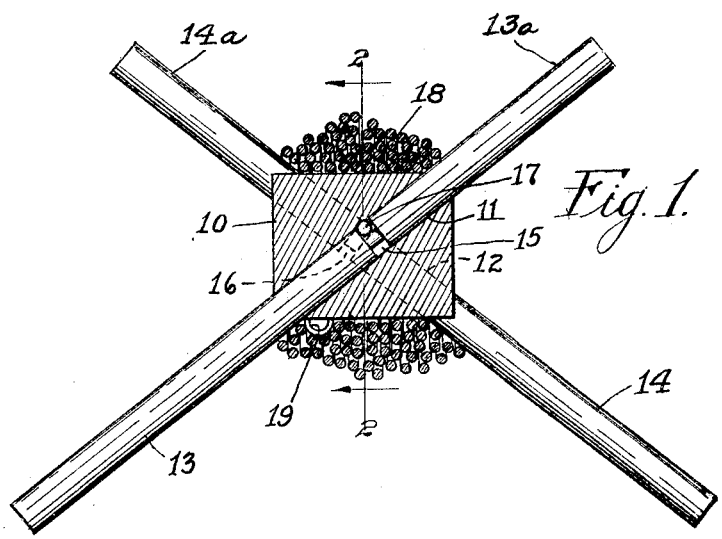
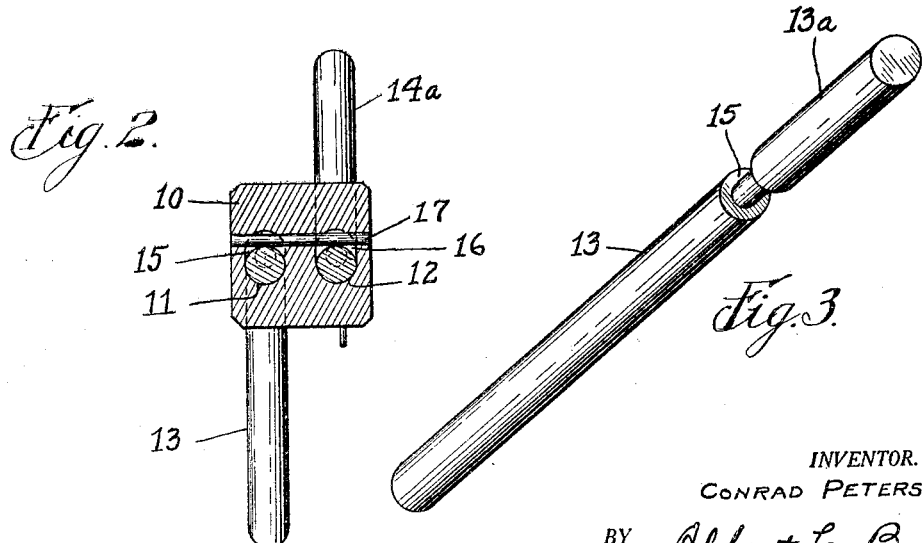
INVENTOR.
CONRAD PETERSON
BY Albert C. Bell
ATTORNEY.

Patented Aug. 26, 1924.

1,505,969

UNITED STATES PATENT OFFICE.

CONRAD PETERSON, OF CHICAGO, ILLINOIS.

CLOTHESLINE REEL.

Application filed April 24, 1922. Serial No. 556,315.

*To all whom it may concern:*

Be it known that I, CONRAD PETERSON, a citizen of the United States, residing at Chicago, in the county of Cook and State of Illinois, have invented a new and useful Improvement in Clothesline Reels, of which the following is a specification.

My invention relates to an improved form of clothes line reel consisting of but three parts, namely a block forming the central portion of the structure which retains the parts in proper relative position and at the same time serves as a hub on which to wind the line and two handle bars extending diagonally through the block and loosely contained so as to rotate in the block, each of said handle bars extending sufficiently at one end to retain the wound line on the block and extended somewhat further at its other end to serve as a handle to be engaged by the operator.

The advantages of my improved construction are that the device may be readily used by any one, the line may be wound on the reel by holding both handles and imparting a rotary motion to the reel which is greatly facilitated by permitting the handles to rotate freely in the block, and the reel may rotate freely on either handle when grasped alone in unwinding the line from the reel and further by holding both handles without imparting rotary motion to the device, the device may be employed to tighten the line. The handles are held by simple means consisting of a single pin or nail against longitudinal movement in the block. In addition to the above advantages my device is characterized by the extreme of simplicity and cheapness of construction.

My invention will best be understood by reference to the accompanying drawings showing a preferred embodiment thereof in which—

Fig. 1 is a view showing the reel in side elevation with a portion of the block removed to better show the construction, Fig. 2 is a sectional view of the parts shown in Fig. 1 taken along the line 2—2, and Fig. 3 is a perspective view of one of the handles used in the device.

Similar numerals refer to similar parts throughout the several views.

As shown in Figs. 1 and 2 the body portion of the reel consists of a block 10 preferably of wood through which inclined holes 11 and 12 are formed in parallel planes and in directions crossing each other. Handles 13 and 14 extend through the holes 11 and 12 and consist preferably of round wooden rods which may rotate freely in the holes in the block. At the crossing point of the rods, grooves 15 and 16 are formed in which a single pin or nail 17 is held by the block to prevent longitudinal displacement of both of the handles in their holes. The upper ends of the handles as shown at 13ª and 14ª in Fig. 1 are extended beyond the block a sufficient distance to retain the wound line 18 between them, the block 10 serving as a hub or drum on which the line is wound. For convenience the block is provided with an eye or staple 19 for securing the end of the line to the reel. The other ends of the handles extend from the block a somewhat greater distance than the ends 13ª and 14ª, to retain the wound line between them and also to be grasped by the two hands of the operator, the construction being such that for this condition, by the flexing of the wrists, a rotary movement is imparted to the entire device without movement of either handle in the hand grasping it, this rotary motion being freely permitted by the loose fit of the handles in the holes in the block. In this manner the clothes line or other flexible line is wound on the reel and, furthermore, it will be observed that if it is desired at any time to tighten the line, this may be done by holding the hands stationary and pulling on the reel since this movement imparts no rotary tendency to the block but on the other hand effectively resists the rotary tendency of the block due to the pull on the line and prevents rotation of the block.

When it is desired to unwind the line, but one of the handles 13 and 14 is grasped by the user and for this condition the remaining portions of the reel are free to rotate around that handle as an axis.

The two handles are of identically the same construction, as indicated more clearly in the enlarged view in Fig. 3 for the handle 13 and it will be noted that the device is of the simplest possible construction, consisting only of the central block, the two handles and the retaining pin; that there is nothing to get out of order about the device and furthermore that it is cheap to manufacture. The device is admirably adapted for holding clothes line when the latter is not in use and by using the reel for this purpose the difficulty frequently experienced in having a line twist and tangle is entirely avoided. It will further be observed that no change whatever in the relation of the parts is required to adapt it particularly to either the winding or the unwinding operation and that with either operation there is no movement whatever of either handle in the hand of the operator, thus making the use of the device easily acquired. While the line wound on the reel rests against the handles, it will be understood that it offers little resistance to the turning of the handles, in fact so little, that the operation of the device is not interfered with in any way. It will be understood that the principle requisite in constructing my device is to secure the relation between the parts above described and also the described operation of the parts relatively to each other. While I have mentioned wood as the preferable material for constructing the parts for the sake of cheapness, it will be understood that any material may be employed which is adapted to the purpose set forth and that any desired conformation may be given any of the parts.

While I have shown my invention in the particular embodiment above described, it will be understood that I do not limit myself to this exact construction as I may employ equivalents known to the art at the time of the filing of this application without departing from the scope of the appended claims.

What I claim is:

1. In a clothes line reel, the combination of a central block having holes extending diagonally through the block in parallel planes and in directions crossing each other, handles extending through said holes and rotatable therein, each of said handles having a groove therein, and a pin extending through said block and lying in both of said grooves.

2. In a clothes line reel, the combination of a central block having holes extending diagonally through the block in parallel planes and in directions crossing each other, handles extending through said holes and rotatable therein, each of said handles having a groove therein, and a pin extending through said block and lying in both of said grooves, each of said handles being cylindrical throughout and extending from one side of said block a sufficient distance to retain the wound line thereon and extending a greater distance from the other side of said block to both retain the wound line thereon and form an operating handle.

3. In a clothes line reel, the combination of a central block having holes extending diagonally through the block in parallel planes and in directions crossing each other, handles extending through said holes and rotatable therein, each of said handles having a groove therein, a pin extending through said block and lying in both of said grooves, each of said handles being cylindrical throughout and extending from one side of said block a sufficient distance to retain the wound line thereon and extending a greater distance from the other side of said block to both retain the wound line thereon and form an operating handle, and a device carried by said block for holding the end of a line.

4. In a clothes line reel, the combination of a block having separate holes extending therethrough in parallel planes and in directions crossing each other, rods extending through said holes and each projecting from one side of said block to retain a wound line thereon and projecting from the other side of said block to retain a wound line thereon and form a handle for operating the device, and means for preventing longitudinal motion of said handles in said holes.

5. In a clothes line reel, the combination of a block having separate holes extending therethrough in parallel planes and in directions crossing each other, a pin carried by said block and extending through the side of each of said holes and a rotary rod in each of said holes having a groove engaged by said pin.

6. In a clothes line reel, the combination of a block having separate holes through it in different directions, rods in said holes and means retaining said rods in said block, said rods being rotary in said block and extending therefrom sufficiently to retain the wound line on said block and form operating handles for the device.

In witness whereof, I hereunto subscribe my name this 15th day of April, A. D. 1922.

CONRAD PETERSON.